United States Patent
Mount et al.

(10) Patent No.: US 7,656,404 B1
(45) Date of Patent: Feb. 2, 2010

(54) LINE TRIMMING AND ARROW HEAD PLACEMENT ALGORITHM

(75) Inventors: George F. Mount, Palo Alto, CA (US); Abhinav Mittal, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 681 days.

(21) Appl. No.: 11/386,228

(22) Filed: Mar. 21, 2006

(51) Int. Cl.
*G06T 11/20* (2006.01)

(52) U.S. Cl. ...................... 345/440; 717/132

(58) Field of Classification Search ............. None
See application file for complete search history.

(56) References Cited

U.S. PATENT DOCUMENTS

| | | | |
|---|---|---|---|
| 4,393,394 A | 7/1983 | McCoy | |
| 5,093,787 A | 3/1992 | Simmons | |
| 5,208,906 A | 5/1993 | Morgan | |
| 5,433,483 A | 7/1995 | Yu | |
| 5,515,487 A * | 5/1996 | Beaudet et al. | 345/440 |
| 5,649,216 A | 7/1997 | Sieber | |
| 5,737,440 A | 4/1998 | Kunkler | |
| 5,877,819 A | 3/1999 | Branson | |
| 5,883,639 A | 3/1999 | Walton et al. | |
| 6,052,486 A | 4/2000 | Knowlton et al. | |
| 6,084,598 A | 7/2000 | Chekerylla | |
| 6,141,008 A * | 10/2000 | Bloomfield | 715/800 |
| 6,181,383 B1 | 1/2001 | Fox et al. | |
| 6,181,838 B1 | 1/2001 | Knowlton | |
| 6,195,452 B1 | 2/2001 | Royer | |
| 6,243,721 B1 | 6/2001 | Duane et al. | |
| 6,356,279 B1 | 3/2002 | Halstead, Jr. et al. | |
| 6,380,940 B1 | 4/2002 | Halstead, Jr. et al. | |
| 6,392,673 B1 | 5/2002 | Andrew et al. | |
| 6,396,500 B1 | 5/2002 | Qureshi et al. | |
| 6,456,305 B1 | 9/2002 | Qureshi et al. | |
| 6,473,093 B1 | 10/2002 | Halstead, Jr. et al. | |
| 6,504,544 B1 | 1/2003 | Hollingsworth et al. | |
| 7,423,646 B2 * | 9/2008 | Saini et al. | 345/440 |
| 2005/0171960 A1 * | 8/2005 | Lomet | 707/100 |
| 2007/0103468 A1 * | 5/2007 | Saini et al. | 345/440 |
| 2009/0063324 A1 * | 3/2009 | Rothschild | 705/37 |

OTHER PUBLICATIONS

Morochove, R., "First Look: Microsoft Office Small Business Accounting, Software Giant Tailors New Version of Office Suite for Small-Business Users," PC World, Nov. 5, 2004, 3 pages, [online] [Retrieved on Jan. 31, 2006] Retrieved from the Internet <URL:http://www.pcworld.com/news/article/0,aid,118495,00. asp>.

Oktem, B., "Intuit Launches QuickBooks 2006," CDN, www.ITBusiness.ca, pp. 16, Nov. 18, 2005.

Morochove, R., "QuickBooks 2006 Boosts Power Features", PC World, Feb. 2006, 2 pages, vol. 52, No. 1, The Gale Group.

* cited by examiner

*Primary Examiner*—Kee M Tung
*Assistant Examiner*—David H Chu
(74) *Attorney, Agent, or Firm*—Osha • Liang LLP (57) ABSTRACT

A system and method sets display characteristics of a workflow diagram of a launch screen associated with a software application. In one embodiment, the system and method receives user input regarding a configuration of the software application, determines at least one display characteristic of the workflow diagram based on the user input, and sets the display characteristics of a target element of the workflow diagram. The system and method identifies adjacent elements associated with the target element, determines display characteristics of the adjacent elements, and sets the display characteristics of the target element based on the display characteristics of the adjacent elements.

20 Claims, 5 Drawing Sheets

LINE TRIMMING AND ARROW HEAD PLACEMENT ALGORITHM

BACKGROUND

The present invention relates generally to systems and methods for formatting flow diagrams. Some software applications provide a launch screen including graphical elements providing users with access to various functions. The launch screen can display such graphical elements as nodes in a flow diagram connected by directional lines to illustrate the relationships among the various functions. Because the graphical elements are interconnected by the directional line elements as a flow diagram in the launch screen, how one element is displayed both affects and depends on how other elements are displayed. Subsequently, when the configuration of an element changes, it usually not only causes the display of the associated node to change, but also the display of other elements not directly associated in the flow diagram.

One approach to properly set the display characteristics of an element in a flow diagram is to restrict the person designing the flow diagram so that he/she must choose from a set of preset configurations when creating/modifying the flow diagram. Because the display characteristics of all elements in flow diagrams corresponding to the preset configurations can be provided along with the preset configurations, the resulting flow diagrams are likely to be displayed properly. This approach limits flexibility because flow diagram designers are restricted by both the preset configurations and the provided display characteristics of elements in corresponding flow diagrams.

Another approach to set the display characteristics of an element in a flow diagram is to leave the decision to the flow diagram designer. This approach gives the designer total control in flow diagram design, but it also burdens the designer with the responsibility of setting and updating display characteristics of all elements in the flow diagram, which is usually very tedious. Because any changes to the display characteristics of an element can potentially affect other elements directly or indirectly associated with the element, the process of setting and updating is usually tedious and time consuming, exposing the resulting flow diagram to human errors. This is especially the case when the flow diagram is on the launch screen of a software application, since the designer faces additional challenges of keeping the updated flow diagram well displayed to provide users with easy access to various functions of the application.

SUMMARY

In various embodiments, the present invention provides methods and systems for setting the display characteristics of elements in a flow diagram.

In one embodiment, a system according to the present invention identifies display characteristics of lines in a flow diagram. Starting with an enabled node, the system identifies lines leaving the node. For each of such lines, the system identifies the node the line leads to, and determines the display characteristics of the node recursively based on lines leaving the node. The system then sets the display characteristics of the line based on the display characteristics of the node it leads to.

In another embodiment, a system identifies display characteristics of a node in a flow diagram. The system identifies lines leading to and leaving the node. For each of the lines, the system determines display characteristics of the line recursively based on the other node associated with the line. The system then sets the display characteristics of the node based on the display characteristics of the lines.

In another embodiment, a system identifies display characteristics of elements in a flow diagram. The system loads a collection of superseding rules. For a given element, the system identifies adjacent elements, and determines the display characteristics of each adjacent element based on the superseding rules. The system then sets the display characteristics of the element based on the superseding rules and the display characteristics of the adjacent elements.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey principles of the invention to those skilled in the art.

Overview

Figure 1A:
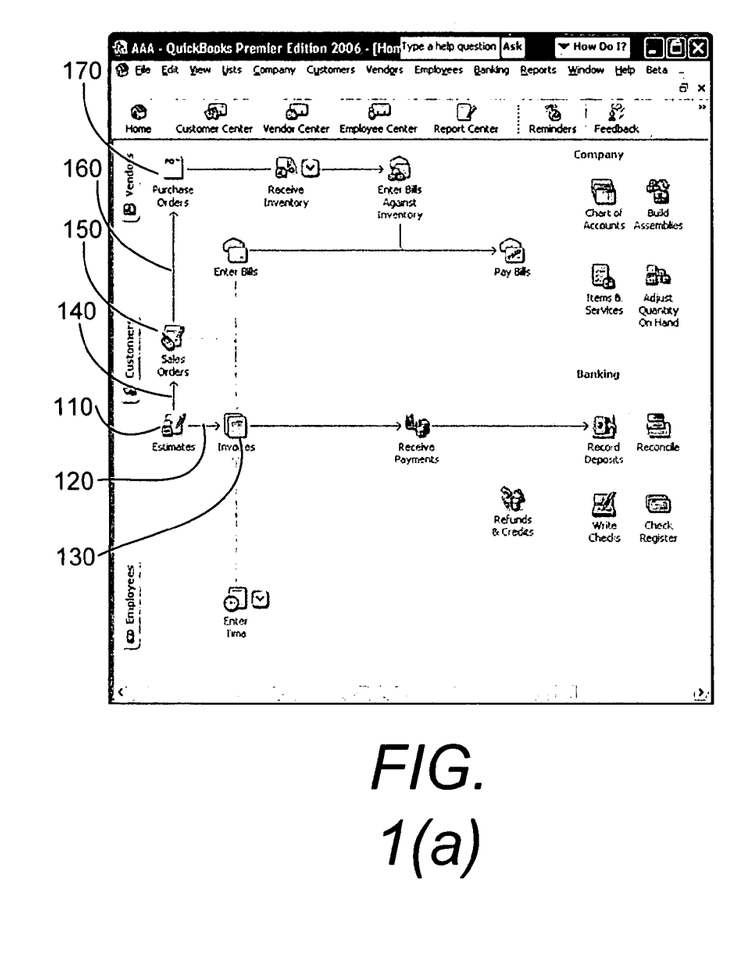
FIGS. 1(a) and 1(b) are screen shots depicting examples of flow diagrams.
Figure 1B:
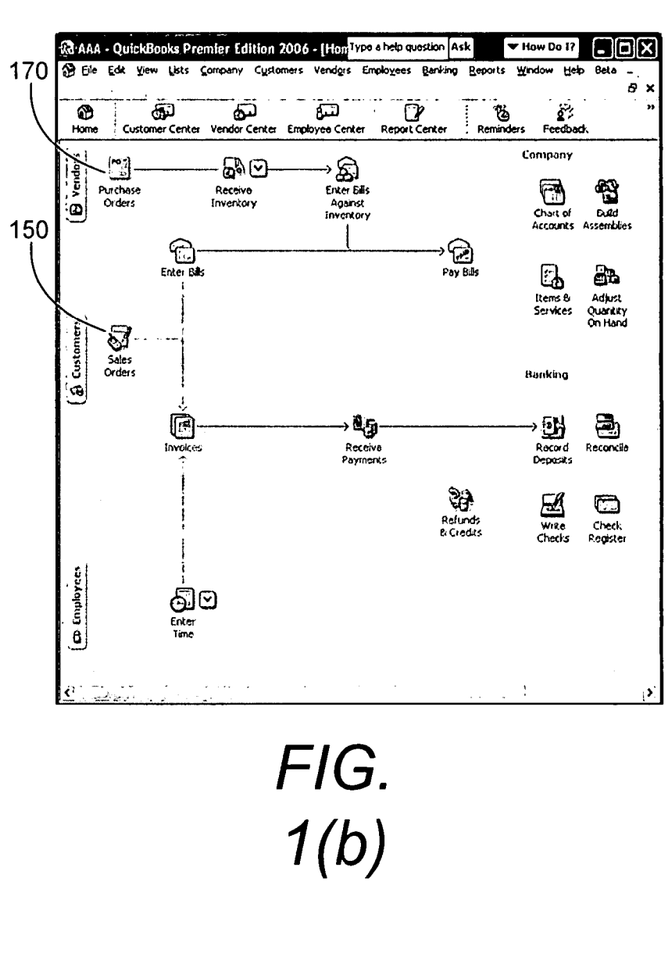

Flow diagrams are broadly used to present systems and product processes by illustrating physical and information flows among components of a flow diagram. For example, flow diagrams are frequently used as a navigation paradigm for users to select various features within a software application. Examples of such navigation paradigm include the launch screen of an accounting software application as illustrated in FIGS. 1(a)-(b). For example, the user can click on a node labeled Pay Bills, and the software will take the user to a screen for bill payments. The flow diagram provides the user with context when selecting commands and navigating the software application.

The embodiment description herein sets forth the present invention in the context of a flow diagram in the launch screen of a software application. A launch screen is a user interface displaying various features, and users can launch the displayed features by interacting with the user interface. The flow diagram comprises nodes connected by directional lines. The nodes represent various functionality and/or features of the software application. The lines represent directional flows among the various features. The direction of each line may or may not be displayed. The flow diagram is subject to the configuration settings of the software application, such as whether a node is enabled, the direction of a line, and the like.

The configuration settings affecting the flow diagram can be modified in several ways. The software application itself can change the configuration settings. For example, different versions of the same software application support different configuration settings. The end users of the software application can configure the application based on their specific needs. The software application can also modify the configuration based on the end user's previous behavior to provide to the end user a "personalized" configuration. A software application can have multiple launch screens, each associated with a different configuration. It is noted that the invention is not limited to the context of launch screen of a software application.

Because lines and nodes are displayed to illustrate the directional relationships among the various features, how one element, node or line, is displayed depends on how other related elements are displayed. Thus, the modification of one element affects the display characteristics of elements associated with the element, which in turn affects those of other elements.

For example, when a node is deleted, all lines leading to or leaving it should also be deleted. This may in turn affect the display of other nodes connected to the affected lines. By contrast, when a node is hidden, depending on whether there are lines leading to the hidden node, lines leaving the hidden node may or may not be hidden as a result.

Embodiments of the present invention determine how an element should be displayed based on the display characteristics of other related elements, thus freeing flow diagram designers from the burden of setting all display characteristics of elements when designing a flow diagram. Also, designers are given freedom to set superseding rules to overwrite the default logic in deciding the display characteristics of elements.

System Architecture

Figure 2:
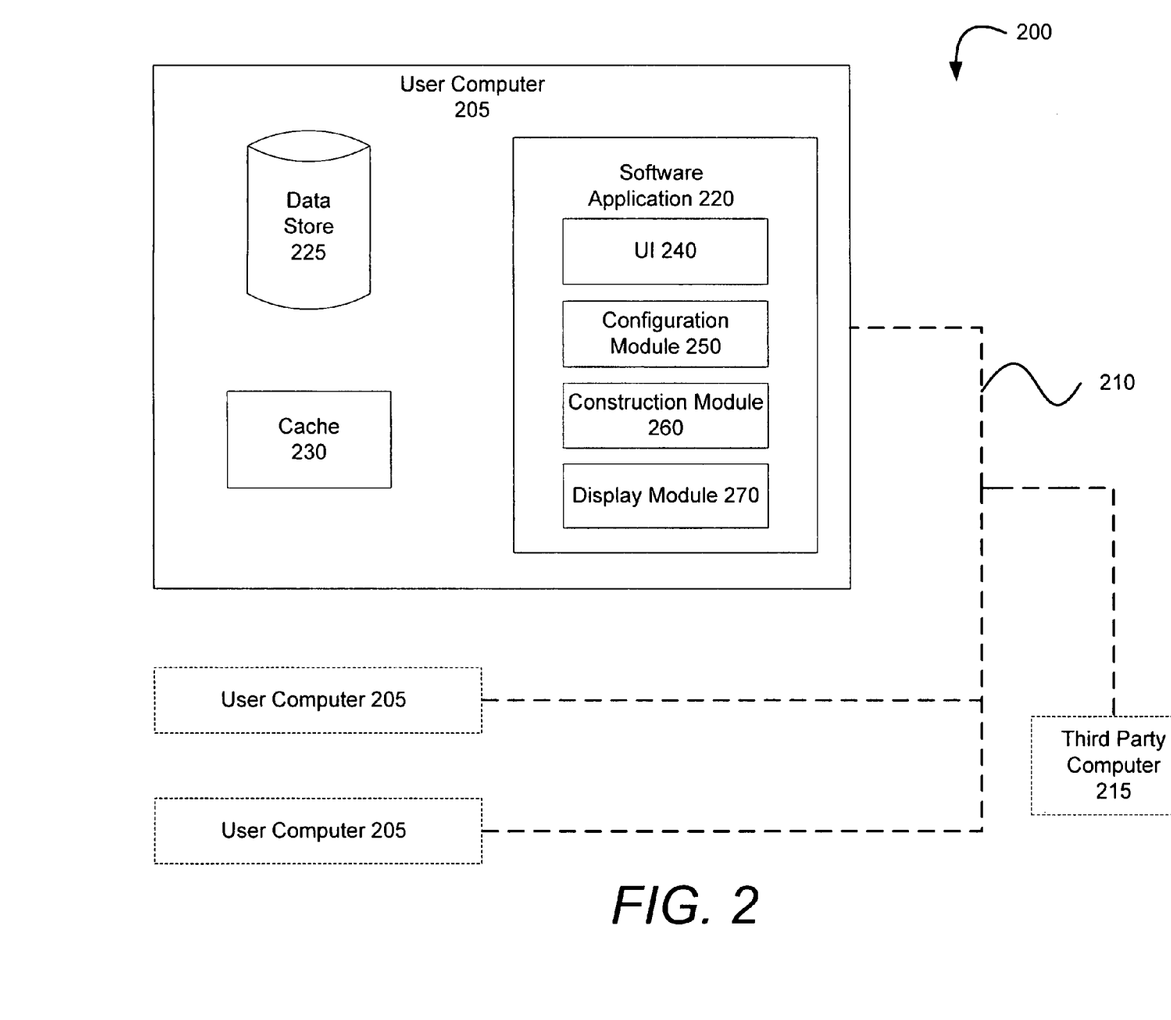
FIG. 2 is a block diagram illustrating an architecture for one embodiment of the present invention.

FIG. 2 is a block diagram illustrating the architecture of one embodiment of a system 200 useful for supporting a software application 220 for diagram design. In such a system 200, there is provided at least one user computer 205, which may be a stand-alone device or may be communicatively coupled to a network 210 and/or one or more third party computers 215, as indicated by dotted lines.

The user computer 205 includes a processor, an addressable memory, and other features that are not illustrated, such as a display, local memory, input/output ports, and a network interface. In other embodiments one or more of the components of the user computer 205 may be located remotely and accessed via a network, e.g., 210. The network interface and a network communication protocol provide access to a network 210 and other computers, such as other user computers 205 or third party computers 215, along with access to the Internet, via a TCP/IP type connection, or to other network embodiments, such as a LAN, a WAN, a MAN, a wired or wireless network, a private network, a virtual private network, or other networks. In various embodiments the user computer 205 may be implemented on a computer running a Microsoft operating system, Mac OS, various flavors of Linux, UNIX, Palm OS, and/or other operating systems.

The third party computers 215, if present, also may be computer systems, similar to the user computer described above. For example, one embodiment of a third party computer 215 is a financial institution computer system, which provides additional information for user software. In this embodiment, the user software application 220 described herein may be a financial management software package capable of communicating with the financial institution computer system to access information from pre-existing user accounts (e.g., obtain account balances to determine available funds), and provide payment instructions for making payments to vendors.

The user computer 205 includes a software application 220, data store 225, and data cache 230. The software application 220 comprises a number of executable code portions and data files. These include code for creating and supporting a user interface 240 according to one embodiment of the present invention, as well as for determining display characteristics of elements in diagrams displayed in the user interface 240. In one embodiment, the software application 220 is accounting software or financial management software. The user interface 240 includes a launch screen or main screen where features of the software application 220 are displayed within a flow chart for users to navigate. In other embodiments, the software application 220 can also be implemented as a stand-alone application outside of a financial management software package.

The software application 220 is responsible for orchestrating the processes performed according to the methods of the present invention. The software application 220 includes a configuration module 250, a construction module 260, and a display module 270 according to one embodiment of the present invention.

The configuration module 250 sets the default and preset display characteristics of elements in a diagram by loading such information from data sources such as the data store 225 into the elements. The construction module 260 sets the display characteristics of elements in the diagram based on a set of default rules, optional superseding rules, and the display characteristics of related elements. In one embodiment, the construction module 260 is in a diagram design application separate from the accounting software. In other embodiments, the construction module 260 is within the accounting software and can dynamically respond to any configuration changes affecting the flow diagram. The display module 270 outputs the diagram with the resulting display characteristics in the user interface 240. Also, the output generated by the invention can be displayed on a screen, transmitted to a remote device, stored in a database or other storage mechanism, or used in any other way.

Figure 3:
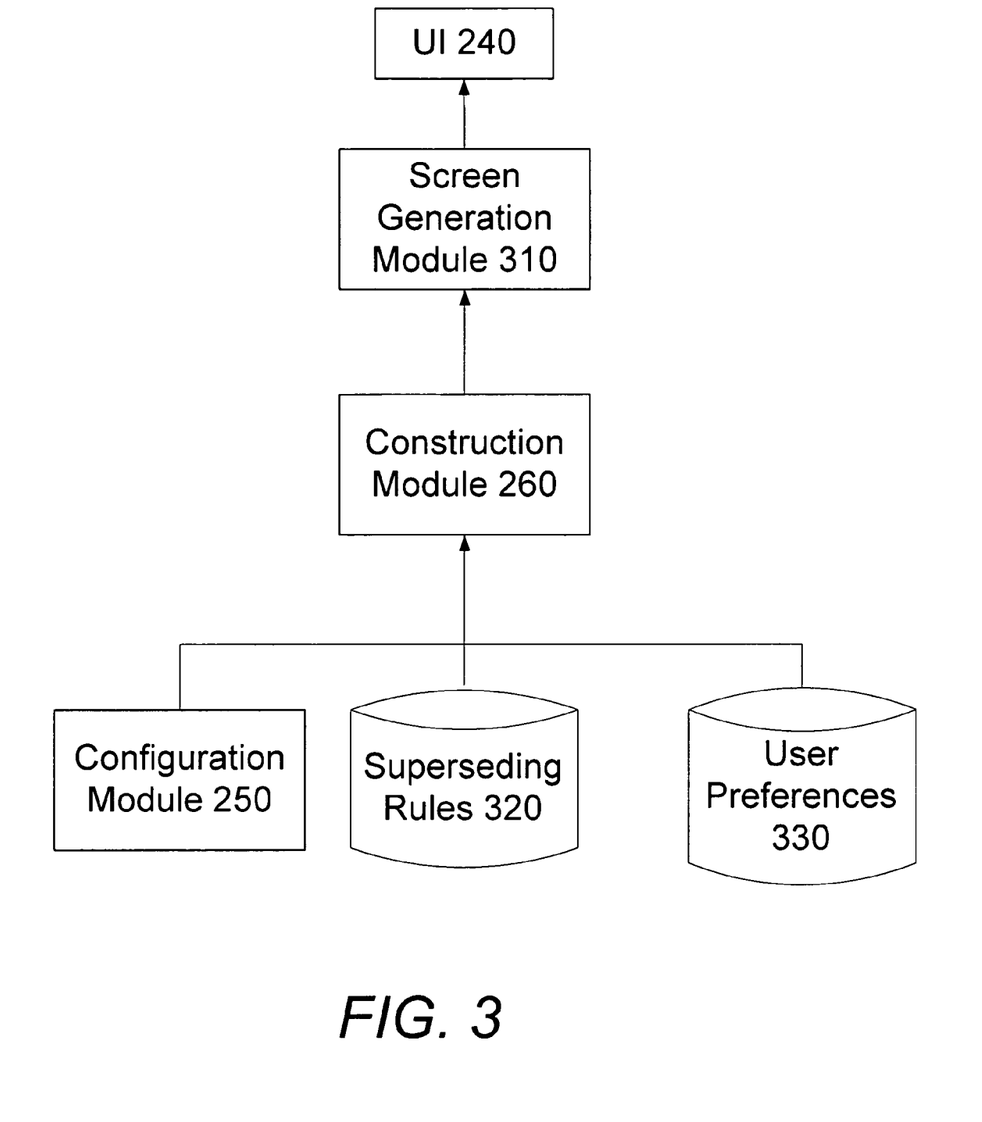
FIG. 3 is a simplified block diagram of a system architecture for displaying a flow diagram in accordance with the present invention.

In another embodiment of the present invention as illustrated in FIG. 3, the construction module 260 reads the default and preset display characteristics of element in a diagram from the configuration module 250 and reads the superseding rules 320 and user preferences 330 from data sources such as the data store 225. The construction module 260 sets display characters of elements in the diagram based on the preset display characteristics, superseding rules 320, user preferences 330, and default display characteristics. A screen generation module 310 generates the launch screen of the software application based on the display characters of elements in the diagram set by the construction module 260, and outputs the launch screen to the user interface 240.

The above software portions 250-270 and 310 need not be discrete software modules. The software configuration shown is meant only by way of example; other configurations are contemplated by and within the scope of the present invention.

The software application 220 may be provided to the user computer 205 on a computer readable media, such as a CD-ROM, diskette, or by electronic communication over the network 210 from one of the third party computers 215 or other distributors of software, for installation and execution thereon. Alternatively, the software application 220, data store 225, and data cache 230 can be hosted on a server computer, and accessed over the network 210 by the user, using for example a browser interface to the software application 220.

The data store 225 may be a relational database or any other type of database that stores the data used by the software application 220, for example account information in the financial management software embodiment referenced above. The data store 225 may be accessible by the software application 220 through the user interface 240. Some data from the data store 225 may be added to the data cache 230 upon initialization of the software application 220. The software application 220 and the data store 225 may be stored and operated on a single computer or on separate computer systems communicating with each other through a network 210.

The data cache 230 is a standard cache of small, fast memory holding recently accessed data. The data cache 230 may include, for example, one or more lists of elements according to one embodiment of the present invention.

One skilled in the art will recognize that the system architectures illustrated in FIGS. 2-3 are merely exemplary, and that the invention may be practiced and implemented using many other architectures and environments.

Method

A flow diagram includes nodes connected by lines, indicating a direction of flow. Depending on the purpose of the flow diagram, some elements of the diagram need not be displayed. For example, a flow diagram designer might determine that for a flow connecting multiple nodes, only the line connected to the final node need display an arrow indicating the direction of the flow. Embodiments of the present invention setting display characteristics of elements in a flow diagram are now described with reference to the accompanying Figures.

Figure 4:
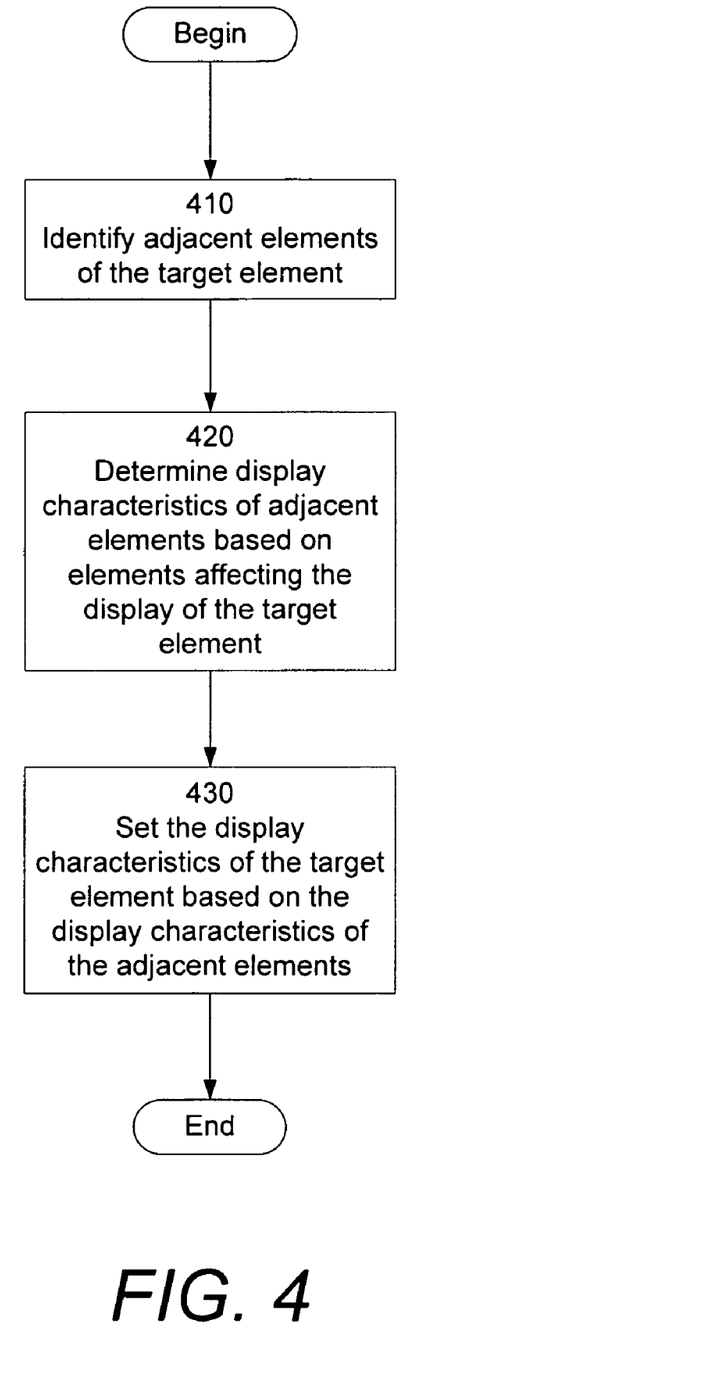
FIG. 4 is a block diagram illustrating an exemplary processing for determining display characteristics of an element in a flow diagram in accordance with the present invention.

Referring now to FIG. 4, there is shown a flow diagram depicting a method for setting the display characteristics of an element in a diagram, in accordance with one embodiment of the present invention. The steps of the process illustrated in FIG. 4 may be implemented in software, hardware, or a combination of hardware and software.

In one embodiment, the present invention is implemented in the construction module 260 to set the display characteristics of elements in the diagram.

The process illustrated in FIG. 4 commences with a collection of elements in a diagram. For purpose of illustration, the process is hereby described in terms of a flow diagram consisting nodes connected with directed lines. Each element, line or node, has an enable display characteristic, determining whether the element is displayed or hidden. In one example, the enable display characteristic can have any of the following values: Unknown (meaning that the display characteristic of the associated element is not set yet), Enabled (meaning that the associated element needs to be displayed), Enabled_Middle_Node (meaning that the associated element needs to be displayed, and connects on to another enabled node), Disabled (meaning that the associated element need not be displayed), Disabled_Middle_Node (meaning that the associated element need not be displayed, and connects on to an enabled node).

In addition, each line has a direction display characteristic determining the direction of the line, and a show-direction display characteristic, determining whether the line displays its direction with an arrow. The show-direction display characteristic can be True (meaning that the associated line is displayed along with an arrow indicating the direction of the line), False (meaning that the associated line is displayed without an arrow), or Unknown (meaning that whether the associated line is displayed along with an arrow is not yet determined).

Figure 5A:
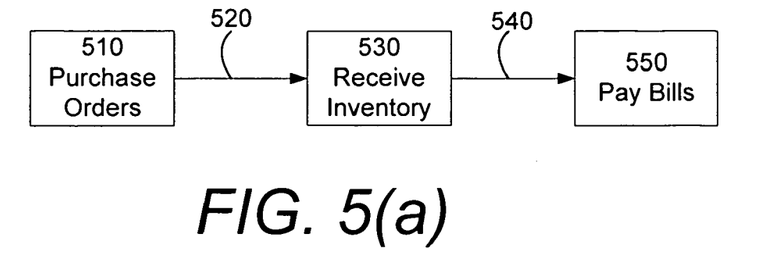
FIGS. 5(a)-(b) illustrate an example of determining display characteristics of a line in a flow diagram according to an implementation consistent with the principles of the present invention.

One example of the collection of elements is shown in FIG. 5(a). In FIG. 5(a), line 520 leaves node 510 and leads to node 530, and line 540 leaves node 530 and leads to node 550.

Figure 6A:
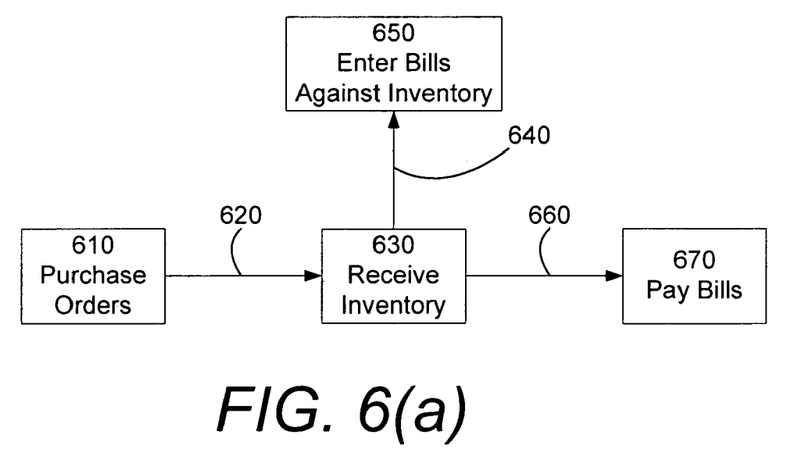
FIGS. 6(a)-(b) illustrate an example of determining display characteristics of a node in a flow diagram according to an implementation consistent with the principles of the present invention.

Another example of the collection is shown in FIG. 6(a). In FIG. 6(a), line 620 leaves node 610 and leads to node 630, line 640 leaves node 630 and leads to node 650, and line 660 leaves node 630 and leads to node 670. Note that both FIGS. 5(a) and 6(a) are shown to illustrate the relationships among all elements in the flow diagrams, and do not necessarily reflect the display characteristics of each element, such as the enable display characteristics. Thus, they are not the correct display of the flow diagrams.

In one embodiment, the collection of elements in the diagram is stored as product configuration in the data store 225 and provided to the construction module 260 by the configuration module 250.

The display characteristics of elements 510-550 and 610-670 are shown in the chart below. Note that the display characteristics of the elements are incomplete. The display characteristics shown can be default display characteristics when the elements are first created, preset display characteristics stored in the product configuration and determined by the construction module 260, or display characteristics set by users.

| Element ID | Enable Display Characteristic | Direction Display Characteristic | Show-Direction Display Characteristic |
|---|---|---|---|
| 510 | Enabled | | |
| 520 | Unknown | To 530 | Unknown |
| 530 | Disabled | | |
| 540 | Unknown | To 550 | Unknown |
| 550 | Enabled | | |
| 610 | Enabled | | |
| 620 | Unknown | To 630 | Unknown |
| 630 | Unknown | | |
| 640 | Unknown | To 650 | Unknown |
| 650 | Disabled | | |
| 660 | Unknown | To 670 | Unknown |
| 670 | Disabled | | |

The construction module 260 identifies 410 adjacent elements of a target element in a flow diagram. Adjacent elements are elements that are associated with the target element. For example, adjacent elements of a line are the node it leaves and the node it leads to, and adjacent elements of a node are the lines leaving it and the lines leading to it.

For example, when the construction module 260 determines the display characteristics of lines, the construction module 260 first identifies an enabled node. For each line leaving the enabled node, the construction module 260 identifies 410 a lead-to node (the node the line leads to), and the enabled node (the node the line leaves), as the adjacent elements of the line. For each line leaving the lead-to node, the construction module 260 identifies its adjacent elements following the same logic.

To prevent circular processing of the same set of lines, the construction module 260 identifies adjacent elements for a line no more than once. In some embodiments, the circular prevention is achieved by adding an attribute to each line in the diagram with an initial value false. The construction module 260 sets the attribute to be true after identifying the adjacent elements of the line. After processing all enabled nodes in the flow diagram, the construction module 260 determines the lines not yet identified as disabled.

Applying the above logic to the flow diagram shown in FIG. 5(a), the construction module 260 first identifies node 510, an enabled node with only one line leaving it, line 520. The construction module 260 then identifies 410 node 530, the node line 520 leads to, and node 510, the node line 520 leaves, as the adjacent elements of line 520.

FIG. 1(a) is a screen shot depicting an example of flow diagram illustrating a business workflow in the launch screen of a finance software application. As illustrated, line 120 leaves node 110 and leads to node 130, and line 140 leaves node 110 and leads to node 150. After user disables node 110, the construction module 260 determines the display characteristics of lines in the diagram.

Applying the above logic to the flow diagram shown in FIG. 1(a), because there is no line leading to the disabled node 110, the construction module 260 would not have identified lines 120 and 140 by processing enabled nodes in the flow diagram. As a result, the construction module 260 determines the lines 120 and 140 as disabled, as shown in FIG. 1(b).

When the target element is a node, the construction module 260 identifies 410 lines leading to the node and lines leaving the node as the adjacent elements of the node. Applying this logic to node 630 in the flow diagram illustrated in FIG. 6(a), the construction module 260 identifies 410 lines 620, 640, and 660 as the adjacent elements of node 630.

The construction module 260 determines 420 the display characteristics of the identified adjacent elements, and then sets 430 the display characteristics of the target element based on the display characteristics of the adjacent elements. The display characteristics of the adjacent elements are determined based on the display characteristics of elements affecting the display of the target element. Because elements affecting the display of the target element may be affected by other elements, this process of determining the display characteristics of adjacent elements is recursive.

In one example, lines leading to a disabled node that does not connect on to another enabled node are disabled. Thus, elements potentially affecting the enable display characteristic of a target line include the node the target line leads to, lines leaving the node, nodes that the lines lead to, and so on. As a result, when determining the enable display characteristic of a target line, the construction module 260 determines the enable display characteristic of an adjacent node, the node the target line leads to, based on the display characteristics of these elements potentially affecting the enable display characteristic of the target line. If the node the target line leads to is disabled and the node connects on to another enabled node, the construction module 260 determines the enable display characteristic of the node to be Disabled_Middle_Node. Alternatively, the information that the node connects on to an enabled node can be stored in a separate attribute associated with the node. Alternatively, instead of saving such information in the node, the construction module 260 can treat all elements affecting the display of the target line as adjacent elements of it, even though not all of them are associated with the target line.

Continuing the example determining the display characteristics of line 520 in the flow diagram illustrated in FIG. 5(a), the construction module 260 determines the display characteristics of node 530, the adjacent node that line 520 leads to, based on the enable display characteristics of elements 530-550. Because node 530 is disabled, the construction module 260 needs to determine the enable display characteristic of line 540, the only line leaving node 530, in the same manner the construction module 260 determines whether the target line 520 is enabled. Because node 550 is enabled, the construction module 260 determines line 540 as enabled. As a result, the construction module 260 determines 420 the enable display characteristic of the node 530 Disabled_Middle_Node, and sets 430 the enable display characteristic of line 520 to be Enable based on the enable display characteristic of node 530.

In another example, a line is displayed with an arrow presenting its direction only when the line leads to an enabled node that does not continue on to another enabled node. Thus, elements potentially affecting the show-direction display characteristic of a target line include the node the target line leads to, lines leaving the node, nodes that the lines lead to, and so on. As a result, the construction module 260 determines the enable display characteristic of an adjacent node, the node that the target line leads to, based on the display characteristics of these elements potentially affecting the show-direction display characteristic of the target line. If the adjacent node that the target line leads to is enabled and the node connects on to another enabled node, the construction module 260 determines the enable display characteristic of the node to be Enabled_Middle_Node. Alternatively, the information that the node connects on to another enabled node can be stored in a separate attribute associated with the node. Alternatively, instead of saving such information in the node, the construction module 260 can treat all elements affecting the display of the target line as adjacent elements of it, even though not all of them are associated with the target line.

Figure 5B:
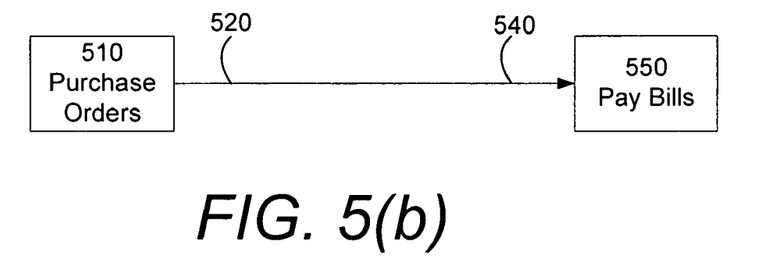

Continuing the example of determining the display characteristics of line 520 in the flow diagram illustrated in FIG. 5(a), the construction module 260 determines the display characteristics of node 530, the adjacent element that line 520 leads to, based on the enable display characteristics of elements 530-550. Because node 530 is disabled, line 540 and node 550 do not affect the show-direction display characteristic of line 520, thus the construction module 260 does not need to determine the display characteristics of line 540 and node 550. As a result, the construction module 260 determines 420 the enable display characteristic of node 530 unchanged, and sets 430 the show-direction display characteristic of line 520 False based on the enable display characteristic of node 530, the adjacent element that line 520 leads to. The resulting flow diagram is illustrated in FIG. 5(b), in which node 530 is hidden and line 520 does not display an arrow. Note that in FIG. 5(b) the line connecting nodes 510 and 550 comprises two lines, line 520 without an arrow, and line 540 with an arrow displaying its direction.

In yet another example, nodes with no enabled lines leading to or leaving from are disabled. Thus, elements potentially affecting the enable display characteristic of a target node include lines leading to or leaving the target node, the other nodes the lines are associated with, and so on. As a result, the construction module 260 determines the enable display characteristics of the adjacent lines, the lines leaving or leading to the target node, based on the display characteristics of these elements potentially affecting the enable display characteristic of the target node. As long as one adjacent line is enabled, the target node is enabled.

Figure 6B:
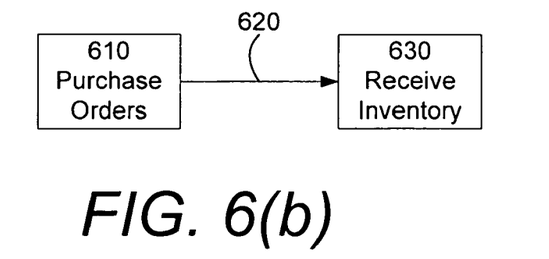

Continuing the example of determining the display characteristics of node 630 in the flow diagram illustrated in FIG. 6(*a*), the construction module 260 determines the display characteristics of lines 620, 640, and 660, the adjacent lines of node 630, based on the enable display characteristics of lines 620, 640, and 660, and nodes 610, 650, and 670. Because node 610 is enabled, and line 620 connects node 610 and the target node 630, the construction module 260 deems line 620 as enabled when determining the display characteristics of node 630. Because line 620 is an enabled adjacent line to node 630, it alone determines the display characteristics of node 630, and the construction module 260 does not need to determine the enable display characteristics of lines 640 and 660, and nodes 650 and 670, since they do not affect the display of target node 630. As a result, the construction module 260 determines 420 the enable display characteristic of line 620 as Enable, and sets 430 the enable display characteristic of node 630 as Enable. The resulting flow diagram is illustrated in FIG. 6(*b*), in which target node 630 is displayed along with elements 610-620, and elements 640-670 are hidden.

In another embodiment, the configuration module 250 loads superseding rules 320 and passes them on to the construction module 260 before the construction module 260 determines display characteristics of elements in a flow chart. Under this embodiment, the construction module 260 first applies the superseding rules 320 to determine the display characteristics, and applies the default logic only when the superseding rules 330 do not apply. The superseding rules are designed to set exceptions to the general logic, such as removing configurations without business sense. One example of such superseding rules 320 is that if a node representing estimates is disabled, then the line connecting the nodes representing sales orders and purchase orders is also disabled.

Applying the above superseding rule to the flow chart illustrated in FIG. 1(*a*), when node 110, representing estimates, is disabled by the user, the default logic does not disable line 160, because nodes 150 and 170, the two adjacent elements of line 160 representing sales orders and purchase orders respectively, are both enabled. But because the superseding rule specifies that when node representing estimates is disabled, line 160 shall be disabled, the construction module 260 applies this superseding rule instead of the default logic and disables line 160, as illustrated in FIG. 1(*b*).

In another embodiment, users can set their own preferences how the diagram should be displayed to overwrite the default logic of the construction module 260. Such rules can be saved as user preferences 330 in data sources such as the data store 225. The configuration module 250 loads the user preferences 330 based on the identity of the user, and passes them on to the construction module 260 before the construction module 260 determines display characteristics of elements in a flow chart. Similar to the treatments of superseding rules 320, the construction module 260 first applies the user preferences 330 to determine the display characteristics, and applies the default logic only when the user preferences 330 do not apply. One example of such user preferences 330 is that the node representing estimate in the flow diagram is always disabled. Another example is that the font of labels in the flow diagram should be Times New Roman.

After the construction module 260 sets the display characteristics of elements in the diagram, the screen generation module 310 generates the launch screen based on the diagram with the display characteristics set by the construction module 260, and the user interface 240 displays the generated launch screen. In one embodiment, the displayed launch screen is static; in some other embodiments, the displayed launch screen is dynamic, and any changes made to the product configuration will be reflected to the displayed launch screen. In another embodiment, the construction module 260 generates multiple diagrams based on different product configurations, and the screen generation module 310 generates multiple launch screens corresponding to the generated multiple diagrams. Based on the user's selection of product configuration, the user interface 240 displays the corresponding launch screen. In yet another embodiment, the construction module 260 only generates diagram corresponding to the product configuration selected by the user, and the user interface 240 displays the corresponding launch screen to the user generated by the screen generation module 310.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of setting display characteristics associated with a launch screen of a software application, the method comprising:
   receiving user input from an end user of the software application changing a configuration of the software application, the configuration determining a navigational structure of a workflow diagram;
   determining at least one of a plurality of display characteristics of at least one of a plurality of elements of the workflow diagram based on the user input, each of the plurality of elements comprising a line or a node;
   setting display characteristics of a target element, wherein the target element comprises a line, wherein the plurality of display characteristics of the target element includes an if-enabled display characteristic and a direction display characteristic, comprising:
      identifying at least one adjacent element, each adjacent element being associated with the target element;
      for each of the at least one adjacent element, deciding display characteristics of the adjacent element;
      identifying a directed-to element among the at least one adjacent element, the directed-to element being determined by the direction display characteristic of the target element; and
      responsive to the if-enabled display characteristic of the directed-to element being Disabled, setting the if-enabled display characteristic of the target element Disabled, otherwise setting the if-enabled display characteristic of the target element Enabled; and
   generating the launch screen of a software application based at least in part on the workflow diagram.

2. The method of claim 1, wherein deciding display characteristics of the adjacent element comprises:
   identifying at least one neighboring element, each neighboring element being associated with the adjacent element;
   for each of the at least one neighboring element, deciding display characteristics of the neighboring element; and
   deciding the display characteristics of the adjacent element based on the display characteristics of the at least one neighboring element.

3. The method of claim 1, wherein deciding the display characteristics of the adjacent element is performed recursively.

4. The method of claim 1, wherein the plurality of display characteristics includes preset display characteristics, and wherein setting the display characteristics of the target element comprises:
   setting the display characteristics of the target element that are not the preset display characteristics based on a collection of superseding rules.

5. The method of claim 1, wherein the if-enabled display characteristic of an adjacent element is Enabled, the adjacent element being different from the directed-to element.

6. The method of claim 1, wherein the launch screen is a navigational tool, and wherein each element comprising a node is associated with a component of the software application.

7. The method of claim 1, wherein the launch screen is static.

8. The method of claim 1, further comprising:
   repeating the steps to generate a second launch screen, wherein each launch screen is associated with a product configuration.

9. The method of claim 8, further comprising:
   responsive to the selection of a product configuration, selecting one of the generated launch screens for display.

10. The method of claim 1, wherein steps are performed respective to a selection in product configurations.

11. The method of claim 1, further comprising:
    responding to the display characteristics of the target element being different from the original display characteristics of the target element, generating the launch screen according to the new display characteristics of the target element.

12. The method of claim 1, further comprising:
    identifying information affecting a configuration of the software application, the configuration determining a navigational structure of the workflow diagram.

13. The method of claim 12, wherein the information comprising version information of the software application.

14. The method of claim 12, wherein the information comprising information about previous user behavior.

15. A system for setting display characteristics associated with a launch screen of a software application, comprising:
    a processor for executing programs; and
    a construction module executable by the processor, the construction module including:
       instructions for receiving user input from an end user of the software application changing a configuration of the software application, the configuration determining a navigational structure of a workflow diagram;
       instructions for determining at least one of a plurality of display characteristics of at least one of a plurality of elements of the workflow diagram based on the user input, each of the plurality of elements comprising a line or a node;

instructions for setting display characteristics of a target element, wherein the target element comprises a line, wherein the plurality of display characteristics of the target element includes an if-enabled display characteristic and a direction display characteristic, comprising:

instructions for identifying at least one adjacent element, each adjacent element being associated with the target element;

instructions for deciding display characteristics of each of the at least one adjacent element;

instructions for identifying a directed-to element among the at least one adjacent element, the directed-to element being determined by the direction display characteristic of the target element; and instructions, responsive to the if-enabled display characteristic of the directed-to element being Disabled, for setting the if-enabled display characteristic of the target element Disabled, otherwise setting the if-enabled display characteristic of the target element Enabled; and instructions for generating the launch screen of a software application based at least in part on the workflow diagram.

16. The system of claim 15, wherein the instructions for deciding the display characteristics of the adjacent element are performed recursively.

17. The system of claim 15, wherein the if-enabled display characteristic of an adjacent element is Enabled, the adjacent element being different from the directed-to element.

18. A computer program product for use in conjunction with a computer system, the computer program product comprising a computer readable storage medium and a computer program mechanism embedded therein, the computer program mechanism including:

instructions for receiving user input from an end user of the software application changing a configuration of the software application, the configuration determining a navigational structure of a workflow diagram;

instructions for determining at least one of a plurality of display characteristics of at least one of a plurality of elements of the workflow diagram based on the user input, each of the plurality of elements comprising a line or a node;

instructions for setting display characteristics of a target element, wherein the target element comprises a line, wherein the plurality of display characteristics of the target element includes an if-enabled display characteristic, a direction display characteristic and a show-direction display characteristic, the if-enabled display characteristic of the target element being Enabled, comprising:

instructions for identifying at least one adjacent element, each adjacent element being associated with the target element;

instructions for deciding display characteristics of each of the at least one adjacent element;

instructions for identifying a directed-to element among the at least one adjacent element, the directed-to element being determined by the direction display characteristic of the target element;

instructions for identifying dead-end elements, the dead-end elements being associated with the directed-to element, an if-enabled display characteristic of the dead-end element being Enabled, the dead-end elements not including the target element; and instructions, responsive to there being no dead-end element and the if-enabled display characteristic of the directed-to element being Enabled, for setting the show-direction display characteristic of the target element True, otherwise setting the show-direction display characteristic of the target element False; and instructions for generating the launch screen of a software application based at least in part on the workflow diagram.

19. The computer program product of claim 18, wherein the instructions for deciding the display characteristics of the adjacent element are performed recursively.

20. The computer program product of claim 18, wherein the if-enabled display characteristic of an adjacent element is Enabled, the adjacent element being different from the directed-to element.

* * * * *